United States Patent
Baker (10) Patent No.: US 7,361,280 B2
(45) Date of Patent: *Apr. 22, 2008

(54) CATALYTIC ACTIVATED CARBON FOR REMOVAL OF CHLORAMINES FROM WATER

(75) Inventor: Frederick Stanley Baker, Wando, SC (US)

(73) Assignee: MeadWestvaco Corporation, Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/079,977

(22) Filed: Mar. 11, 2005

(65) Prior Publication Data

US 2005/0167367 A1    Aug. 4, 2005

Related U.S. Application Data (60) Division of application No. 10/736,652, filed on Dec. 16, 2003, now abandoned, which is a continuation-in-part of application No. 10/144,201, filed on May 10, 2002, now Pat. No. 6,706,194, which is a continuation-in-part of application No. 10/141,158, filed on May 8, 2002, now Pat. No. 6,699,393.

(51) Int. Cl.
  *C02F 1/28*    (2006.01)
(52) U.S. Cl. ............ 210/668; 210/694; 210/690; 502/416
(58) Field of Classification Search ........... 423/235, 423/236; 210/668, 690, 694; 502/416
See application file for complete search history.

(56) References Cited

U.S. PATENT DOCUMENTS

| | | | | |
|---|---|---|---|---|
| 4,624,937 A | * | 11/1986 | Chou | .......... 502/180 |
| 5,106,501 A | * | 4/1992 | Yang et al. | .......... 210/266 |
| 5,338,458 A | * | 8/1994 | Carrubba et al. | .......... 210/668 |
| 5,356,849 A | | 10/1994 | Matviya et al. | |
| 5,444,031 A | | 8/1995 | Hayden | |
| 5,470,748 A | | 11/1995 | Hayden et al. | |
| 5,637,232 A | | 6/1997 | Hayden | |
| 6,136,189 A | | 10/2000 | Smith et al. | |
| 6,342,163 B1 | | 1/2002 | DeLonge et al. | |
| 6,699,393 B2 | | 3/2004 | Baker et al. | |
| 6,706,194 B2 | | 3/2004 | Baker et al. | |

OTHER PUBLICATIONS

Resing, H. A., et al. "Carbon-13 NMR Spectroscopy of the Charcoal/4-Vinylpyridine System" 1985, Pergamon Press Ltd., Carbon, vol. 23, No. 4, pp. 395-403.*
Pels, J. R., et al. "Evolution of Nitrogen Functionalities in Cabonaceous Materials during Pyrolysis" 1993, Elsevier Science Ltd., Carbon, vol. 33, No. 11, pp. 1641-1653.*
"Alternative Disinfectants and Oxidants." *USEPA Guidance Manual* Apr. 1999 pp. 6-1 to 6-35.
Harp, D. L. "Current Technology of Chlorine Analysis for Water and Wastewater." *Hach Company's Booklet* No. 17, 1995 pp. 1-30.
"Specific Determination of Inorganic Monochloramine in Chlorinated Wastewaters." *Hach Company's Monochloramine Application Note* (reprinted from article) *Water Environment Research*, vol. 72, No. 6, Nov./Dec. 2000, pp. 706-713.

\* cited by examiner

*Primary Examiner*—Stuart Hendrickson
(74) *Attorney, Agent, or Firm*—Terry B. McDaniel; Warunee Srisiri; Neil G. Cohen (57) ABSTRACT

This application discloses a method for enhanced removal of chloramines from a chloramines-containing fluid media by contacting said media with a catalytic activated carbon characterized by having present in the graphene structure of the carbon from 0.01 to 10 wt % of aromatic nitrogen species. The catalytic activated carbons used in the present invention may be prepared from carbon materials that have been contacted or otherwise exposed to ammonia, with or without simultaneous exposure to an oxygen-containing vapor or gas at temperatures above 700° C. and, preferably, are in the form of a solid carbon block.

16 Claims, 9 Drawing Sheets

CATALYTIC ACTIVATED CARBON FOR REMOVAL OF CHLORAMINES FROM WATER

This is a division of application Ser. No. 10/736,652, filed Dec.16, 2003 now abandoned.

This application is a continuation-in-part application of commonly assigned Ser. No. 10/144,201, titled "Improved Method for Removal of Chloramines From Drinking Water," by Frederick S. Baker and Jane F. Byrne, filed on May 10, 2002 now U.S. Pat. No. 6,706,194, which application is a continuation-in-part of commonly assigned Ser. No. 10/141, 158, titled "Improved Method for Removal of Chloramines From Drinking Water," by Frederick S. Baker and Jane F. Byrne, filed on May 8, 2002 now U.S. Pat. No. 6,699,393.

BACKGROUND OF THE INVENTION

1. Field of the Invention

The present invention relates to improvements in the use of a high-performance, catalytically activated carbon for the removal of chloramines from chloramine-containing fluid streams. In particular, this application relates to the use of high-performance, catalytically activated carbon filters for the removal of chloramines from chloramine-containing fluid streams wherein the carbon characterized by having present in the graphene structure of the carbon from 0.01 to 10 wt % of aromatic nitrogen species.

2. Description of the Prior Art

While chlorination has made the U.S. water supply safe from illness producing bacteria, viruses, and parasites, an unhealthy by-product of chlorinating water that contains natural organics is the production of trihalomethanes, which have been linked to increased risk of cancer. One way to reduce this risk is to change from chlorine disinfection to chloramine disinfection. Chloramines are formed from the reaction between ammonia and chlorine. Thus, adding ammonia ($NH_3$) to a chlorination system converts chlorine to chloramines. Specifically, monochloramine, hereafter referred to as "chloramine," in low concentrations arise from the disinfection of potable water sources. To improve the taste and odor of the water and to remove the inherently toxic chloramine, the water is typically contacted with activated carbon. The ability of carbonaceous materials, such as activated carbon, to remove chloramine from aqueous streams is generally well known. It is also known that improvements in removal of chloramine can be achieved by reducing the mean particle diameter of the carbon and by increasing the carbon bed contact time. In some applications, such as in kidney dialysis units, high removal rates of chloramine are particularly important. Although parameters such as contact time and mean particle diameter are known to affect chloramine removal efficiencies, removal performance is neither well understood nor particularly effective.

Activated carbon is used in the treatment of water in the form of powdered activated carbon, granular activated carbon, or shaped activated carbon, such as pellets or spheres. Another form of shaped activated carbon often recommended for point-of-use (POU) and point-of-entry (POE) water treatment, however, is solid block activated carbon. Block activated carbon is a compressed blend of selected activated carbon and a binder material, such as high density polyethylene (HDPE), which is capable of adsorbing a wide range of organic materials. Water is forced through the pores of the densely compacted carbon block, where a combination of mechanical filtration, electrokinetic adsorption, and physical/chemical adsorption takes place to reduce or eliminate a wide range of contaminants.

U.S. Pat. No. 5,338,458, issued on Aug. 16, 1994 to Carrubba et al., titled "Method for Removing Chloramine with Catalytic Carbon," teaches an improved process for the removal of chloramine from gas or liquid media by contacting said media with a catalytically-active carbonaceous char. In practice, however, a product manufactured according to the patent teaching has been found lacking in effectiveness for chloramine removal from drinking water. Additionally, attempts to replicate even the relatively poor performance of the commercial product based on the '458 patent (Centaur®) in solid block form has not been satisfactory. Apparently, the impact of the binder component detracts measurably from the prior art carbon's performance for chloramine removal.

The applicants' pending application Ser. No. 10/141,158, filed May 8, 2002 teaches an improved method of removal of chloramine from drinking water with an activated carbon that is made catalytically active for removal of chloramines by a process of pyrolyzing the (primarily wood-based) carbon while simultaneously passing a gas stream comprised of a mixture of $NH_3$ and an oxygen-containing gas through the carbon.

Also, the applicants' pending application Ser. No. 10/144, 201, filed May 10, 2002 teaches an improved method of removal of chloramine from drinking water with an activated carbon that is made catalytically active for removal of chloramines by a process of pyrolyzing the (primarily wood-based) carbon while simultaneously passing a gas stream comprised of a mixture of $NH_3$ and an oxygen-containing gas through the carbon, wherein the activated carbon is in the form of a solid block.

While the inventions of these prior applications showed great improvement in chloramine removal efficiency over the prior art Centaur® catalytic activated (primarily coal-based) carbons of U.S. Pat. No. 5,338,458, a complete understanding of the reasons for such benefits were not entirely understood. Moreover, it was appreciated that having such understanding could permit controlling the process for treating the activated carbon in a manner to achieve further improved chloramine removal efficiencies and enhanced process productivity.

Accordingly, it is the object of the present invention to provide greater improvements in removal of chloramines from drinking water. It is a further object of the invention to provide an activated carbon that is catalytically active for removal of chloramines apart from factors such as extended contact time, mean particle diameter, and the like which factors are known to affect removal of chloramines. Finally, it is an object of this invention to provide an improved method of chloramines removal using an activated carbon that is catalytically active for removal of chloramines in the form of a solid block activated carbon.

SUMMARY OF THE INVENTION

Generally, the present invention comprises a method for enhanced removal of chloramine from aqueous media by contacting said media with a catalytic activated carbon. The catalytic activated carbons used in the present invention may be prepared from carbon materials that have been contacted or otherwise exposed to nitrogen-containing compounds at temperatures above 700° C. In particular, the catalytic activated carbons used in the present invention may be contacted or otherwise exposed to ammonia, in or out of the presence of an oxygen-containing gas or vapor, at temperatures above 700° C.

The carbonaceous feedstocks from which such carbons are produced are relatively nitrogen-poor, naturally occurring materials, such as lignocellulosic materials and coals. The lignocellulosic materials may include carbons derived from wood, olive pits, and various nut shells, including coconut. The nitrogen-poor feedstocks may be processed as low-temperature carbonized chars or as high-temperature carbonized chars such as activated carbons. Either processed carbon may be oxidized prior to, during, or after carbonization. However, all nitrogen-poor chars must be contacted or otherwise exposed to nitrogen-containing compounds such as ammonia, at high temperatures prior to, during, or after calcination and/or activation at high temperatures. The contact with a nitrogen-containing compound at high temperatures may be in or out of the presence of a gasifying agent, such as steam or carbon dioxide. Additionally, it is essential that the final products in all cases described above be cooled to temperatures below 400° C., preferably 200° C., in an oxygen-free or otherwise inert atmosphere.

The catalytic activated carbons of the present invention are distinguished from prior art carbons by their ability to extract a greater amount chloramine from chloramine-contaminated drinking water more rapidly. When tested under nearly equivalent conditions of contact time, mean particle diameter, concentration of chloramine, and the like, these catalytic activated carbons remove chloramine much more effectively than prior art carbon materials, which have been used for this application in the past, including the carbonaceous chars of U.S. Pat. No. 5,338,458. Other advantages of the present invention will become apparent from a perusal of the detailed description of the presently preferred embodiments.

DESCRIPTION OF THE PREFERRED EMBODIMENT(S)

As noted above, potential toxicity, unpleasant taste, and odor are associated with the use of chloramine disinfection by potable water-treatment plants. Also, as noted, the prior art teaches that effective removal of chloramine from water requires a catalytically-active carbonaceous char, which has been characterized as a carbon that will rapidly decompose hydrogen peroxide in aqueous solution. It is the object of this invention, more specifically, to provide a catalytic activated carbon that exhibits high performance for chloramine removal from water, yet possesses relatively low activity for hydrogen peroxide decomposition compared to prior art carbons. It is a further objective to demonstrate that the invention process for removal of chloramine employing said catalytic activated carbon is an unexpected and surprising (in light of the prior art teaching) improvement over prior art process performance in removing chloramine employing prior art carbons.

While it is appreciated that the U.S. Pat. No. 5,338,458 patentees disclose "activated carbon" as among their taught "catalytically-active carbonaceous chars," it is noted that the catalytic activated carbon disclosed herein is distinguished from the '458 teaching and is distinctive in its surprising and unexpected (based on the '458 teaching) properties for the removal of chloramine.

The catalytic activated carbon of the present invention is generally prepared by the method disclosed in U.S. Pat. No. 4,624,937, which disclosure is incorporated herein, by reference. The '937 patent teaches a method for catalytically oxidizing tertiary amines or secondary amines in the presence of oxygen or an oxygen-containing gas to selectively produce secondary or primary amines, which method comprises the step of treating the carbon catalyst to remove oxides from the surface thereof. In a preferred embodiment of the '937 patent teaching, the surface oxides on the carbon are removed by pyrolyzing the carbon material at a temperature in the range of about 800° C. to about 1200° C. while simultaneously passing a gas stream of an oxygen-containing gas and $NH_3$ through the carbon material in a ratio of up to 90:10 for a time sufficient to remove surface oxides from the carbon. More particularly, the '973 patent teaches the carbon treatment gas stream to include a $NH_3$/oxygen-containing gas mixture from the group consisting of $NH_3/CO_2$, $NH_3/O_2$, $NH_3/H_2O$, and $NH_3/NO_x$, and preferably the $NH_3$/oxygen-containing gas mixture is $NH_3/H_2O$. A particular feature of the invention disclosed and claimed herein is the discovery that the treatment gas does not necessarily require an oxygen-containing gas to strip oxides from the surface of the activated carbon in order to obtain a highly active catalytic carbon product. In fact, in view of the prior art teaching of the requirement of said gas, it was surprising to find that enhanced chloramine removal efficiency was achieved by treatment with ammonia alone. Furthermore, treatment of an activated carbon (such as those obtained from coal, wood, nut shell, pitch, peat, fruit pit, cellulose, lignin, and agricultural waste materials) with ammonia in the absence of an oxygen-containing gas, such as steam, resulted in significantly higher product yields as a result of reduced carbon burn-off (gasification). This is a distinct economic benefit, particularly for high treatment temperatures (e.g., 950° C.) where carbon burn-off in the presence of steam reduced product yields to near half that obtained in the absence of steam.

Using independent, outside test laboratories and industry-accepted protocols, the invention catalytic activated carbon product was evaluated against Calgon Carbon's Centaur® catalytic carbonaceous char product (taught in U.S. Pat. No. 5,338,458) for the reduction of chloramine in drinking water. The independent test data indicated, and the applicants' findings support, that at chloramine concentrations typical for drinking water the invention carbon has a substantial performance advantage over Centaur with respect to both volumetric capacity and kinetics of eliminating chloramine from drinking water. Furthermore, contrary to the teaching of Calgon Carbon's '458 patent, the applicants have demonstrated that high performance for removal of chloramine can be obtained using carbons that exhibit relatively low catalytic activity as determined by a surrogate "t-¾ time" test. (In a variation of the t-¾ time test, considered to be equivalent to the t-¾ test procedure patented by Calgon Carbon (U.S. Pat. No. 5,470,748), instead of monitoring the rate of decomposition of hydrogen peroxide in the presence of an activated carbon by measuring the temperature of the hydrogen peroxide solution under essentially adiabatic conditions, the applicants measured the weight loss resulting from the evolution of oxygen during the carbon-catalyzed decomposition of the hydrogen peroxide under otherwise similar conditions of hydrogen peroxide concentration, carbon loading, and pH, etc. Reference to this surrogate t-¾ test will be in quotation marks.)

In fact, the "t-¾ time" of some of the carbons that exhibited at least twice the chloramine removal performance of Centaur was over 100 minutes, well outside the broadest claim of the '458 patent (<15 minutes).

Chloramine Reduction

Data obtained through the applicants' own experiments on the invention catalytic activated carbons and related carbon products confirmed the superior performance of the invention catalytic activated carbon for removal of chloramine from water. The example below was the results of tests run on the carbon products ($\geq$90%-325 mesh) using a concentration of chloramine near 3 ppm, a typical level for drinking water, at a temperature of 21° C. (70° F.). The chloramine solution was prepared by blending one liter of a solution of ammonium chloride (1.500 g $NH_4Cl$) in water with one liter of a solution containing sodium carbonate (1.250 g $Na_2CO_3$) and Chlorox household bleach (6% NaOCl, 12 ml) in water. This stock solution, containing about 300 ppm of chloramine ($NH_2Cl$), was equilibrated at 21° C. for one hour. A solution containing about 3 ppm chloramine was prepared by diluting 10.0 ml of the stock solution to one liter with water. The actual concentration of the diluted chloramine solution was determined using the colorimetric procedure described in Example 1 (with the omission of the carbon). This test solution of chloramine was equilibrated at 21° C. for one hour before use. All solutions were prepared on the day of the tests using high purity water and, with the exception of the Chlorox bleach, analytical grade reagents.

For the purpose of characterizing the chloramine removal performance of a given carbon product, it can be assumed that, under the conditions of preparation of the chloramine solutions, all the chlorine in the test solution is present in the form of monochloramine, $NH_2Cl$. The high ratio of $NH_4Cl$ to NaOCl (5:1, compared to a stoichiometric ratio of 1:1) used in the preparation of the solutions ensured that the reaction between the ammonium chloride and the sodium hypochlorite would be driven rapidly towards the production of the monochloramine species. Furthermore, the pH of the test solution was about 8.3, a value consistent with the range in which "chlorine" is present in the solution as the monochloramine species; i.e., not as "free chlorine" (HOCl or OCl⁻) or dichloramine ($NHCl_2$) or trichloramine ($NCl_3$). Supporting documentation in this respect can be found in, for example, the USEPA Guidance Manual "Alternative Disinfectants and Oxidants" (April 1999, pp. 6-1 to 6-35); in the Hach Company's Booklet Number 17, "Current Technology of Chlorine Analysis for Water and Wastewater" by Daniel L. Harp (1995, pp. 1-30); and in the Hach Company's Monochloramine Application Note reprinted from the article, "Specific Determination of Inorganic Monochloramine in Chlorinated Wastewaters" (*Water Environment Research*, 75(6), pp. 706-713).

EXAMPLE 1

400 g of water containing chloramine (about 3 ppm) was equilibrated at a temperature of 21° C. 200 mg (±1%) of the carbon test sample was added to the stirred solution and a stopwatch started to record elapsed time. 10 ml aliquots of the carbon/water suspension were removed at periodic intervals and immediately filtered to remove the carbon from treated water. The actual time of filtration of an aliquot of the carbon/water suspension was recorded as the elapsed time for that aliquot. The aqueous filtrates were analyzed for chloramine content immediately following collection of all aliquots of the carbon/water suspension. Working with one filtrate at a time, a DPD (N,N-diethyl-p-phenylenediamine) reagent "pillow" for total chlorine determination (Hach Company, Catalog Number 21056-69) was added to the filtrate (10 ml) and the sample vial shaken for 20 seconds to develop the characteristic magenta color of the "Wurster dye" DPD-oxidation product. The absorbance of the filtrate at a wavelength of 515 nm was measured and the concentration of chloramine remaining in the water was calculated using the appropriate calibration. A "blank" colorimetry measurement was made on the high purity water used to prepare the chloramine solutions to ensure that the absorbance at 515 nm was ±0.001. To compare data for different carbons, chloramine concentration data were normalized to 200.0 mg of carbon on a dry weight basis.

Figure 1:
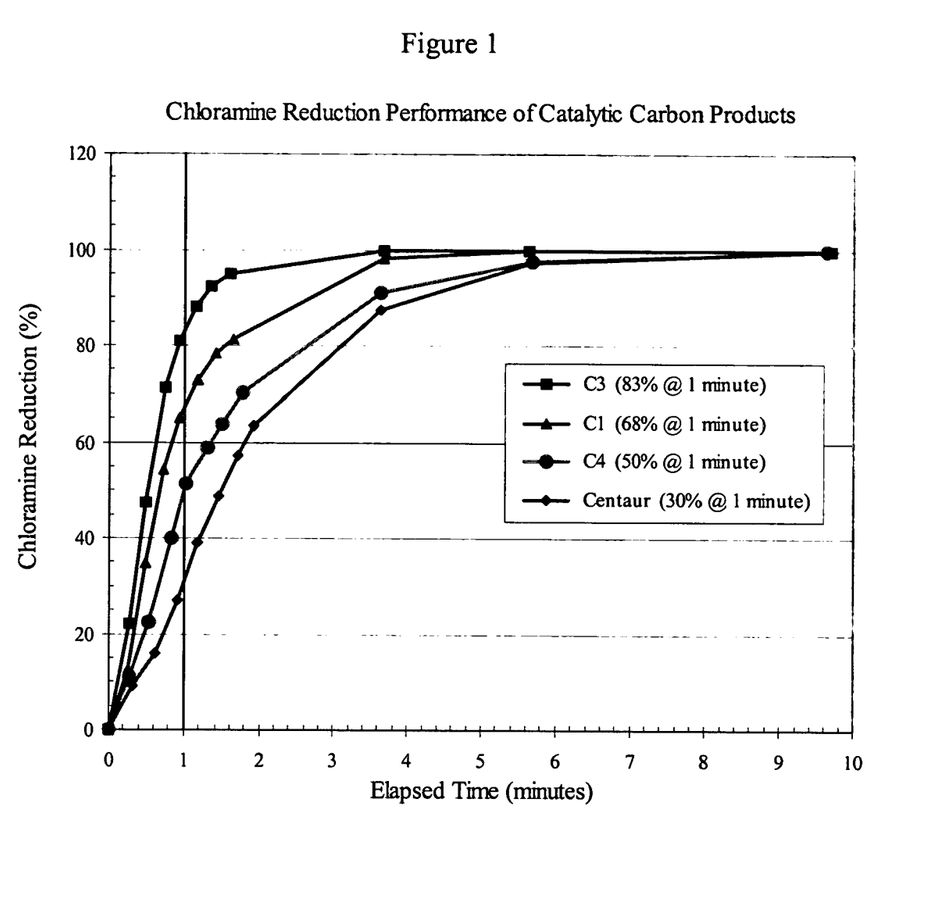
FIG. 1 is a graphical representation of chloramine-reduction performance of invention carbon products and prior art carbon product on a gravimetric basis.

Representative data are shown in FIG. 1 and Table I for a series of carbon products isolated from the production process described in the '937 patent under various conditions of ammonia and steam flows. Data for the Centaur product are included for comparison. (Some of the data from Table I are graphically represented in FIG. 1.)

TABLE I

| Carbon Sample | "t-¾ time" (minutes) | Chloramine Removed at 1 minute (%) |
|---|---|---|
| C1 | 115 | 68 |
| C2 | 6.8 | 81 |
| C3 | 3.2 | 83 |
| C4 | 330 | 50 |
| C5 | 14.5 | 65 |
| C6 | 4.3 | 75 |
| Centaur | 21 | 30 |

It is apparent from FIG. 1 and Table I that all the invention catalytic carbon products exhibited much faster kinetics of chloramine removal from water than Centaur. For example, at an elapsed time of one minute, the invention C3 product reduced the chloramine concentration by 83% compared to only a 30% reduction for the Centaur product. Given the low contact time in water-treatment filters, the kinetics of chloramine removal are of considerable importance with respect to point-of-entry (POE) and point-of-use (POU) filters for residential use and commercial use (e.g., restaurants, beverage manufacture).

EXAMPLE 2

The performance data discussed in Example 1 (FIG. 1 and Table I) were determined using equivalent weights of catalytic carbon products, namely 200 mg. However, POE and POU filters for water-treatment applications contain cartridges of certain standard dimensions, and therefore accommodate a certain fixed volume of filtration medium. Depending on the nature of the precursor material from which a carbon product is produced, the density of different catalytic carbon products can vary widely, resulting in different weights of the respective products in a fixed volume of a filter cartridge. For the case in point, the invention carbons were produced from wood, whereas the Centaur product was produced from coal. For comparable particle sizes, i.e., ≧90%-325 mesh, the apparent density of the coal-based Centaur product is about twice that of the wood-based invention carbons. In practice, this means that a cartridge filter of a given volume can hold twice the weight of the Centaur product than of, in this example, a wood-based carbon.

Figure 2:
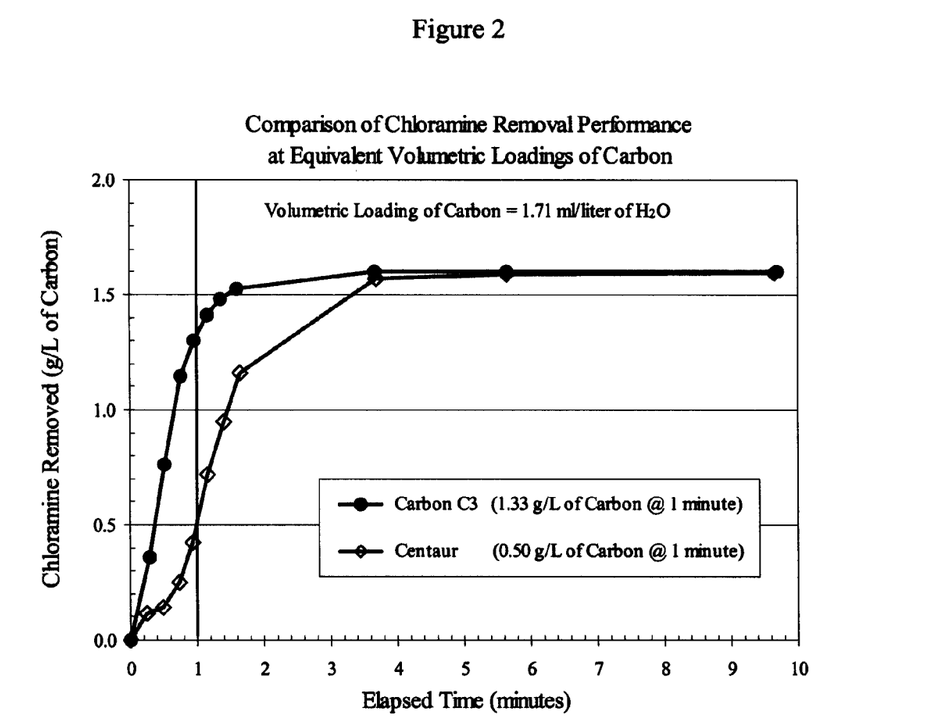
FIG. 2 is a graphical representation of chloramine-reduction performance of invention carbon products and prior art carbon product on a volumetric basis.

If, for the purpose of illustration only, the Centaur and invention carbons exhibited equal chloramine removal performances on a gravimetric (weight) basis, it would be expected that the denser Centaur product would exhibit about twice the performance of the invention carbon on a volumetric basis. As the data in FIG. 1 and Table I demonstrate, however, the gravimetric-based performance of the Centaur product falls far short of the invention carbons at contact times less than one minute. Nevertheless, tests were run on equivalent volumes of the Centaur product and invention carbons to further demonstrate the superior chloramine removal performance of the invention carbons. The tests were run using the procedure described in Example 1, with the exception that the weight of Centaur used in the test was 400 mg, compared to 200 mg of the invention carbons. These weights corresponded to a volume loading of 1.71 ml of carbon per liter of test water. Representative data are shown in FIG. 2 for the Centaur product and invention carbon C3. The chloramine removal performances are expressed in the volumetric-based units of g of chloramine removed per liter of carbon.

Clearly, the invention carbon still exhibited substantially superior performance compared to the Centaur product, despite the fact that the Centaur product was present in the test water at twice the weight of the invention carbon. In fact, it is also clear from FIG. 2 that the performance of the Centaur product at contact times below one minute did not increase in proportion to the doubling of the weight of Centaur product present in the test water. Because the removal of chloramine from water is a result of the catalytic reduction of the chloramine by the carbon, it does not necessarily result that twice the weight of a given product doubles the rate of removal of chloramine from the water. The nature of the time-dependent curve in FIG. 2 for the Centaur product also reveals another reason why the performance of the Centaur product did not increase in proportion to the weight used. Namely, the "S-shaped" character of the curve at the low contact times relevant to practical use (in POE and POU filters) indicates that the Centaur product was slow to "wet" in the test water, which impeded its ability to catalyze the desired reaction. This is a feature characteristic of coal-based carbons, which tend to be more hydrophobic in nature than wood-based carbons.

Catalytic Activity

The catalytic activity of the catalyst plant products and Centuar was measured using the surrogate "t-¾ time" test. The procedure and results are set forth in Example 3.

EXAMPLE 3

The t-¾-time is defined (U.S. Pat. Nos. 5,338,458, 5,356,849, and 5,470,748) as the time at which three-quarters (75%) of the maximum temperature rise has occurred during the decomposition of hydrogen peroxide by a carbon material. It is assumed that this time corresponds to 75% decomposition of the available hydrogen peroxide. In the surrogate "t-¾ time" test used to characterize the catalytic activity of the invention carbon products, the decomposition of the hydrogen peroxide solution was monitored through the weight loss resulting from the evolution of oxygen. In keeping with Calgon Carbon's definition, the "t-¾ time" was assumed to correspond to the point at which 75% of the theoretical weight loss of oxygen from the available hydrogen peroxide had occurred. The weight of carbon, volume of hydrogen peroxide solution, and concentration of the hydrogen peroxide solution were similar to those employed in the Calgon Carbon test. Similarly, the reaction medium was buffered at pH 7.

The "t-¾ time" test data are summarized in Table I, above. Examples of the weight loss curves used to calculate the "t-¾ times" for the invention carbon products are shown in FIG. 3.

It is clear from Table I that the invention carbon products exhibited a wide range of "t-¾ times," from 3.2 to 330 minutes, yet all exhibited high performance for removal of chloramine from water; i.e., 50-83% reduction, compared to only 30% for Centaur. More to the point, the "t-¾ times" of the C1 and C4 products, 115 and 330 minutes, respectively, were substantially greater than the primary claim in the '458 (chloramine use) patent, which is limited to carbon products exhibiting t-¾ times of less than 15 minutes, which would suggest to one skilled in the art that the invention carbon products C1 and C4 are unsuitable for chloramine removal as compared to the catalytically-active carbonaceous chars of the '458 patent.

Figure 3:
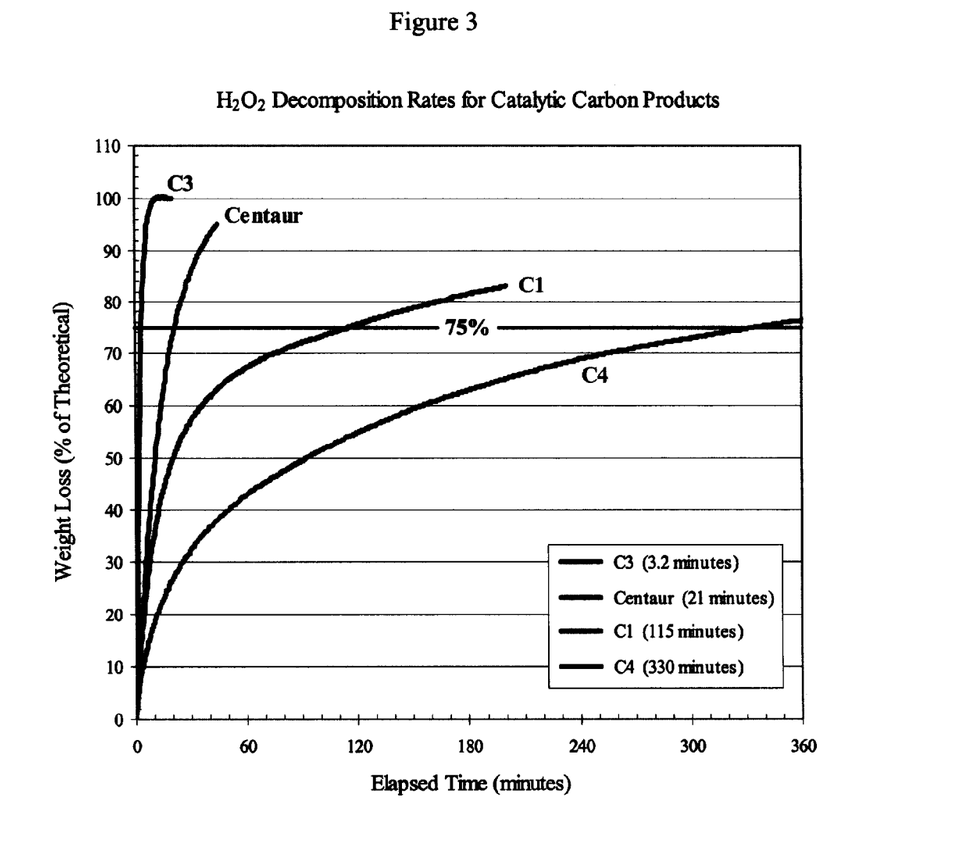
FIG. 3 is a graphical representation of hydrogen peroxide ($H_2O_2$) decomposition rates for invention carbon products and prior art carbon product.

The large difference between the catalytic activities of the C1 and C4 invention carbons and the prior art Centaur product is further exemplified in FIG. 3, where the weight loss due to the evolution of oxygen during the decomposition of the hydrogen peroxide solution is shown as a function of time. The two lower curves for the C 1 and C4 products reflect their relatively low activity towards hydrogen peroxide decomposition compared to the Centaur product. Despite this, the C4 and C1 products exhibited 170-230% of the performance of the Centaur product for removal of chloramine (50 and 70%, respectively, compared to 30% for Centaur). Conversely, the C3, C6, and C2 products in Table I exhibited fast "t-¾ times," 3.2, 4.3, and 6.8 minutes, respectively, but the performance gains in removal of chloramine were modest relative to the C1 product. Yet, all sample invention activated carbon products exhibited far superior abilities for removal of chloramine over the '458 patent product.

Figure 4:
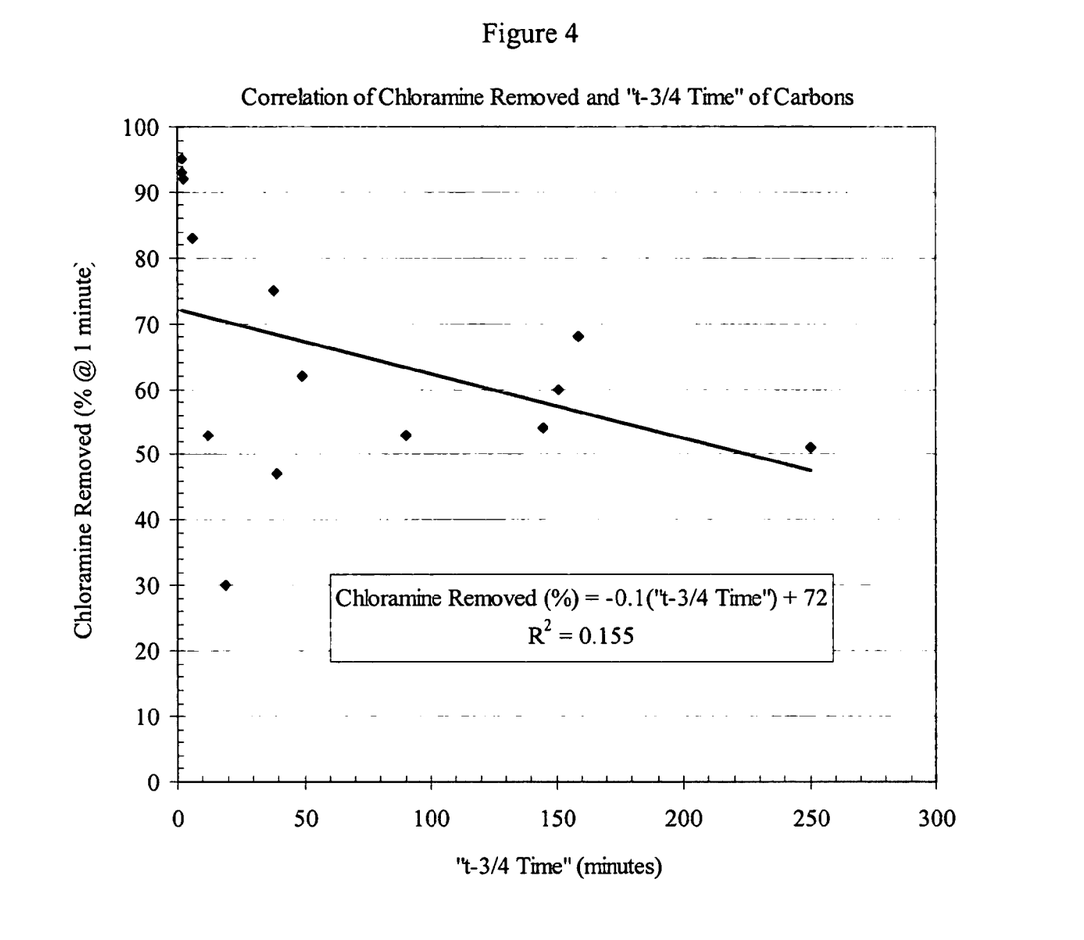
FIG. 4 is a graphical representation of the lack of the correlation between the chloramine-reduction performance and the "t-¾ time" of catalytic carbon products.

Inasmuch as the surrogate "t-¾ time" test is essentially equivalent to the t-¾ time test of the '458 patent, it appears from the data presented that the time measure of the decomposition of 75% of the theoretical weight loss of oxygen from the available hydrogen peroxide had occurred in the presence of a given amount of carbon is not an accurate indication of that carbon's ability to remove chloramine from drinking water. This is exemplified in graphical form in FIG. 4, which demonstrates that there is a very poor correlation between "t-¾ time" and the chloramine reduction performance of catalytic carbons (i.e., very low regression coefficient, "$R^2$," of 0.155). The applicants have shown that carbons with "t-¾ times" well beyond the time taught in the '458 patent to be extremely poor candidates for removing chloramine, in fact, are much better candidates than those taught as excellent candidates in said patent disclosure. The conflict between the data presented herein and the faulty teaching of the '458 patent begs the question, "What carbon material characteristic (or characteristics), then, will provide an accurate indication for enhanced removal of chloramine?"

Figure 5:
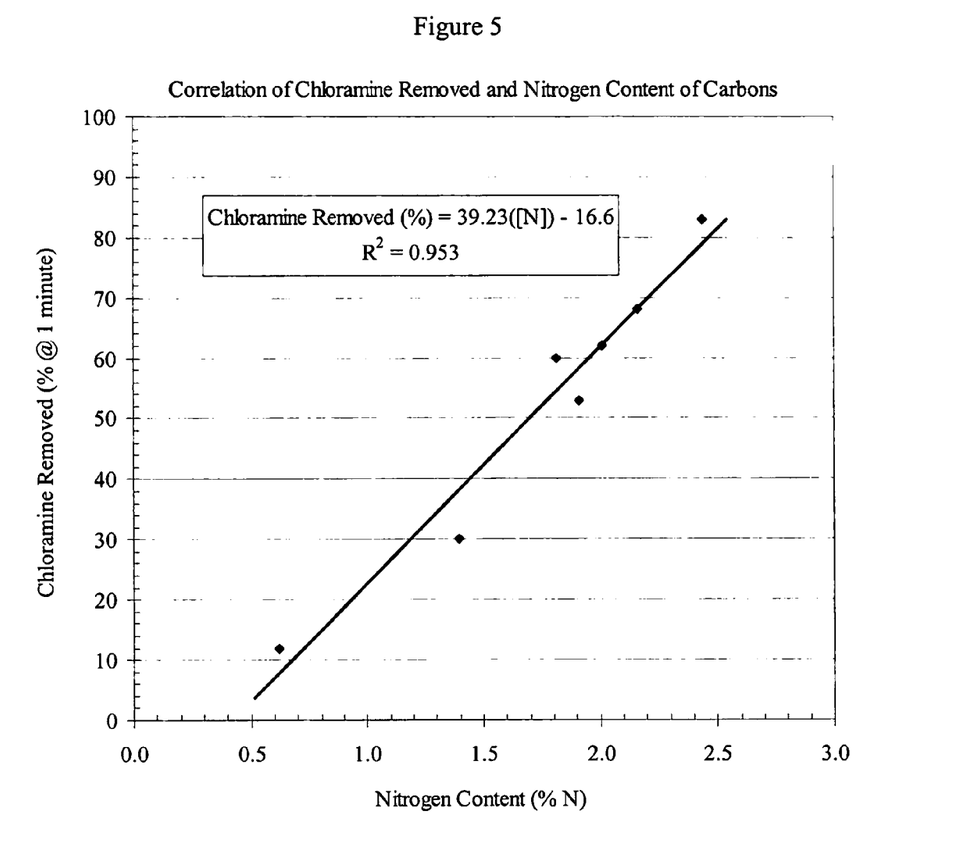
FIG. 5 is a graphical representation of the correlation between the chloramine-reduction performance and the nitrogen content of catalytic carbon products.

The applicants sought to understand the reasons for the different chloramines removal efficiencies between the similarly treated prior art Centaur® product and the invention activated catalytic carbon. It was determined, therefore, to analyze both materials to explore whether such a result involves differing ways the nitrogen enhancement of the carbon occurs. Certainly, the data shown graphically in FIG. 5 indicate that there is a good correlation between the increase in nitrogen content and the improved catalytic activity of carbon products with respect to chloramine reduction in water (i.e., a relatively high regression coefficient, "$R^2$," of 0.953).

EXAMPLE 4

In photoelectron spectroscopy (XPS) analysis, a sample of a material is bombarded with X-ray radiation, causing photoelectrons to be emitted from a core atomic level of the material. Depending on the energy of the atomic level, and of the incident X-ray radiation, the emitted photoelectron has a defining binding energy, enabling elemental and complex chemical state identifications to be made.

The XPS data are summarized in Table II, in which the invention carbons are identified as "C7" through "C13." The prior art catalytic activated carbon of the '937 patent is identified as "P1," and the prior art Centaur product of the '458 patent is identified as "P2." XPS peaks for nitrogen electrons (1 s atomic level) were observed at binding energies of 398-398.4, 399.5-400.6, 401.1, and 403.5 electron volts (eV), respectively. XPS peaks at these binding energies are associated with pyridine (acridine), aromatic ("center"), aromatic ("valley"), and ammonium ion nitrogen species, respectively [1. Pels, J. R., Kapteijn, F., Moulijn, J. A., Zhu, Q., and Thomas, K. M., "Evolution of Nitrogen Functionalities in Carbonaceous Materials During Pyrolysis," *CARBON*, (1995), 33(11), pp. 1641-1653; 2. Bradley, R. H., Hellebust, S., and Daley, R., "On the Chemistry of Nitrogen in the Graphene Structure," *Extended Abstracts of the 24th Biennial Conference on Carbon*, Charleston, S.C., Jul. 11-16, 1999, pp. 420-421]. For purpose of clarification, these nitrogen species are represented by (a), (b), (c), and (e), respectively, in FIG. 6. XPS peaks at binding energies of 400.5 and 401.1 electron volts can also be associated with primary amino groups, represented by (d) in FIG. 6. However, primary amino groups are relatively unstable, and their XPS signatures disappear upon thermal treatment of carbon at temperatures >400° C. [Cuesta, A., Martinez-Alonso, A., Tascon, J. M. D., and Bradley, R. H., "Chemical Transformations Resulting from the Pyrolysis and $CO_2$ Activation of Kevlar Flocks," *CARBON*, (1997), 35(7), pp. 967-976]. Both the invention and prior art carbons had been exposed to temperatures considerably higher than 400° C. during their processes of manufacture, and therefore the presence of amino species in the carbons is considered unlikely.

The XPS data in Table II reveal that that the nitrogen surface chemistries of the invention carbons C7-C13 and the P1 prior art carbon were very different from that of the prior art Centaur product (P2). The C7-C13 and P1 carbons, all of which were produced by contacting an activated carbon with ammonia at a high temperature in the range of 780-960° C., exhibited a significant amount of nitrogen that was present as an aromatic, center species {(b) in FIG. 6}. It is also clear from Table II that, in general, as the proportion of this nitrogen species increased in the carbon product as a result of more favorable process conditions, notably increased temperature of treatment, the chloramine reduction performance of the carbon was enhanced, particularly with respect to the kinetics of chloramine reduction. In very marked contrast, no evidence was found for the presence of the same nitrogen species in the prior art Centaur product (P1). In this context, it is striking that the chloramine reduction performance of the prior art Centaur product was poor.

TABLE II

| Carbon Sample Number | Carbon Precursor | Process Conditions | | | Catalytic Properties | | | Nitrogen Content | | |
|---|---|---|---|---|---|---|---|---|---|---|
| | | | Gas Reactants | | | $NH_2Cl$ Reduction | | | Aromatic "Center" | |
| | | Temp (° C.) | $NH_3$ | Steam | "t-¾" time (min) | 1-min [1] (%) | 60% [2] (min) | Total N (wt %) | (%) [3] | (wt %) |
| C7 | Wood | 788 | Yes | Yes | >4300 | 40 | 2.3 | 3.4 | 46 | 1.57 |
| C8 | | 788 | Yes | No | 3000 | 67 | 0.8 | 2.3 | 75 | 1.75 |
| P1 | | 843 | Yes | Yes | 6.0 | 83 | 0.6 | 2.5 | 46 | 1.14 |
| C9 | | 899 | Yes | Yes | 1.8 | 95 | 0.4 | 4.8 | 70 | 3.39 |
| C10 | | 899 | Yes | No | 6.5 | 91 | 0.3 | 3.0 | 66 | 1.98 |
| P2 | Prior | Centaur As Received | | | 21 | 30 | 1.8 | 1.3 | 0 | 0 |
| C11 | Art | 788 | Yes | Yes | 10 | 77 | 0.4 | 3.0 | 73 | 2.17 |
| C12 | Centaur | 788 | Yes | No | 7.2 | 80 | 0.5 | 1.8 | 78 | 1.43 |
| C13 | Product | 954 | Yes | No | 2.0 | 90 | 0.3 | 2.5 | 86 | 2.17 |

Figure 6:
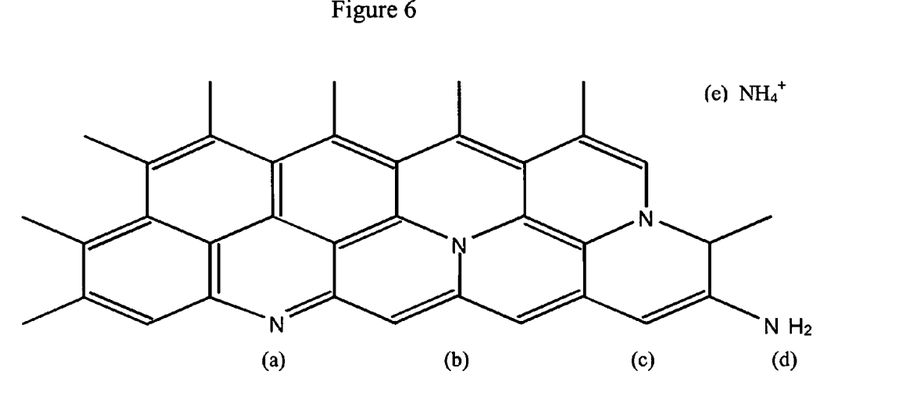
FIG. 6 is a graphical representation of the graphene structure in a catalytic activated carbon showing the different nitrogen species identified by XPS analysis as being present in either the catalytic carbon of the subject invention and/or the product of the '458 patent prior art process.

Table Notes:
[1] The amount (%) of chloramine reduced at a one-minute contact time of the carbon with the test water.
[2] The time (minutes) to obtain a 60% reduction in the initial chloramine concentration in the test water.
[3] The proportion (%) of the total nitrogen content which was present in the carbon as an aromatic, center species {(b) in FIG. 6.}.

EXAMPLE 5

Figure 7:
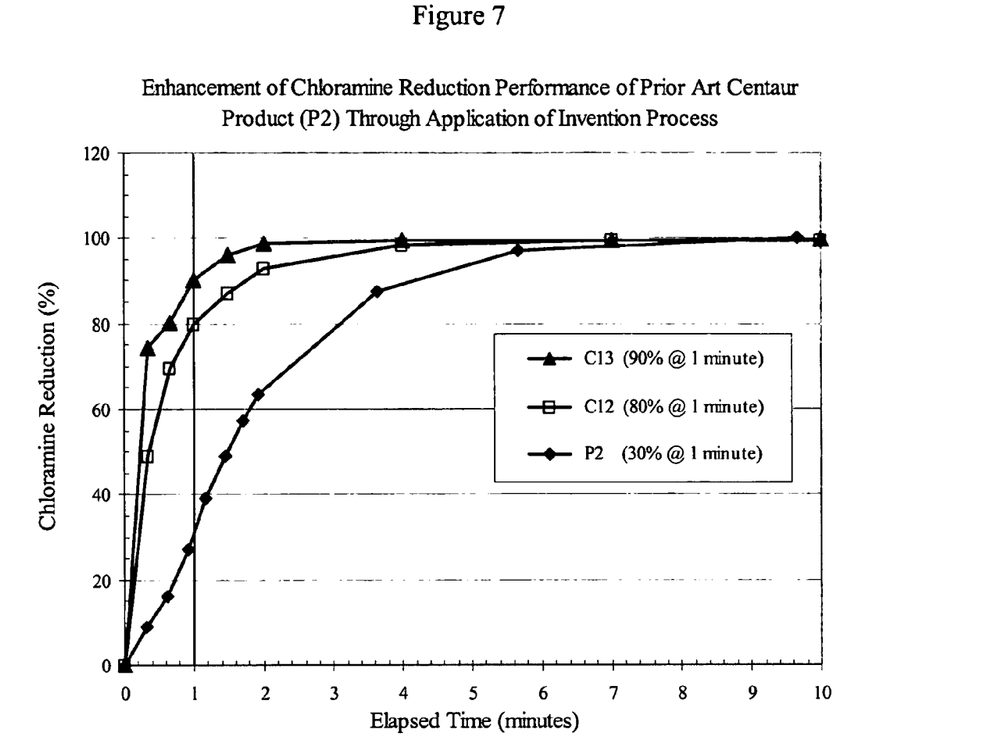
FIG. 7 is a graphical representation of the enhancement of the chloramine reduction performance of the prior art Centaur product through application of the invention process.

Of even greater significance, however, is the fact that when the prior art Centaur product itself was similarly treated with ammonia, the chloramine reduction performance of the product obtained was comparable to the high levels of the invention carbons C8-C10 and the prior art carbon P1. This is clearly evident from the data shown in Table II for the invention carbons C11-C13; namely those produced by treatment of the prior art Centaur product (P2) itself according to the invention process. It is equally clear that whereas no aromatic, center configuration nitrogen was detected in the prior art Centaur product itself, the subsequent treatment of the Centaur product introduced substantial levels of the same nitrogen species {(b) in FIG. 6}. In fact, as the total nitrogen content of the Centaur-based carbon was substantially enhanced through application of the invention process, the proportion of the aromatic, center nitrogen species in the product obtained was as high as almost 90% of the total nitrogen content of the product, resulting in a dramatic improvement in the chloramine reduction performance of the treated Centaur product. This is shown graphically in FIG. 7.

These findings are unexpected given that both the invention and prior processes for manufacture of the respective carbon products involve high temperature treatment of carbons, activated or otherwise, with nitrogen-containing materials. Yet, the invention process results in a carbon product that contains a far greater amount of catalytically-active nitrogen species, both in absolute and relative terms, which greatly contribute to the much superior performance of the invention carbon for chloramine reduction in water. In fact, the prior art Centaur process ('458 patent) did not significantly enhance the total nitrogen content of the carbon product over that of the "nitrogen-poor" char or activated carbon precursor material used in the process. For example, coal-based carbon used in the prior art process typically contains about 0.9 wt % total nitrogen content; i.e., before thermal treatment with a nitrogen-containing material such as urea. As the data in Table II show, the total nitrogen content of the prior art Centaur product (P2) was 1.3 wt %; i.e., an increase (difference) of 0.4 wt % over that of a coal-based precursor carbon. Furthermore, it was revealed through XPS analysis that the bulk (65%) of the 0.4 wt % increase in total nitrogen content of the product was found to be associated with ammonium ion {(e) in FIG. 6}; i.e., an ammonium salt by-product from the urea treatment that is unlikely to be catalytically active for chloramine reduction in water. In essence, therefore, the actual increase in the amount of a catalytically-active nitrogen species in a carbon treated according to the prior art process ('458 patent) was extremely small, which is entirely consistent with the poor performance of the prior art Centaur product for chloramine reduction in water.

EXAMPLE 6

Figure 8:
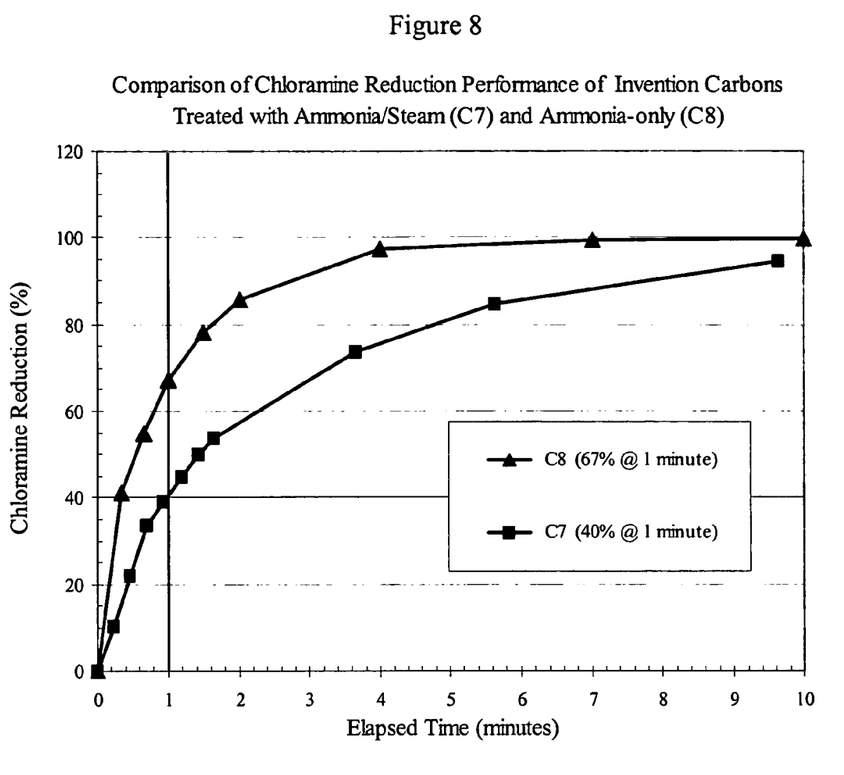
FIG. 8 is a graphical representation of the enhancement of chloramine reduction performance obtained at relatively low temperature by treating a carbon with ammonia in the absence of an oxygen-containing gas.

Overall, the data shown in Table II indicate that the performance of a catalytic activated carbon for chloramine reduction in water can be correlated with a specific nitrogen chemical species. Namely, aromatic nitrogen, and more specifically, the center configuration of aromatic nitrogen in a graphene layer {(b) in FIG. 6}. In general, as the proportion of this nitrogen species increased in the carbon product as a result of more favorable process conditions, the chloramine reduction performance of the carbon was enhanced. A notable example of this is provided by the two invention carbons, C7 and C8. These were obtained by treatment of a wood-based activated carbon with ammonia at 788° C. in the presence (C7) and absence (C8), respectively, of steam. Despite the fact that the ammonia-only treatment (C8 carbon) resulted in a lower total nitrogen content (2.3 wt %) compared to the conventional ammonia/steam treatment (C7 carbon, 3.4 wt %) described in the applicants' pending application Ser. No. 10/141,158, filed May 8, 2002, the chloramine reduction performance of the C8 carbon was substantially greater than that of the C7 carbon (FIG. 8). This finding is consistent with the fact that the ammonia-only treatment (C8 carbon) resulted in a greater proportion and absolute amount of the aromatic, center nitrogen that is believed to be the predominant nitrogen species associated with catalytic activity for chloramine reduction in water. It is also noteworthy that the C7 and C8 carbons exhibited extremely long "t-¾ times" (>4300 and 3000 minutes, respectively), further emphasizing the fact that there is no meaningful relationship between t-¾ time, as determined through the hydrogen peroxide test of the '458 patent, and the chloramine reduction performance of a catalytic activated carbon product. In fact, on the basis of the teaching of the '458 patent, neither of the C7 and C8 invention carbons should have exhibited any significant activity for chloramine reduction in water, let alone the fairly good performance of the C8 invention product.

A similar finding was obtained for the corresponding invention carbons (C11 and C12) produced from the treatment of the prior art Centaur product (P2) with ammonia in the presence (C11) and absence (C12) of steam, respectively, at 788° C. In this instance, the relative increases in chloramine reduction performance and proportion of aromatic nitrogen species were much smaller because the chloramine reduction performance of the C11 carbon obtained from the treatment of the prior art Centaur product with both ammonia and steam was much higher than that of the corresponding C7 carbon; namely, one-minute chloramine reduction figures of 77 and 40% respectively. Based on the prior art teaching, this was an unexpected finding that a coal-based carbon, when subjected to the treatment of the invention process, would more readily yield a product exhibiting high catalytic activity for chloramine reduction than a wood-based carbon under otherwise comparable processing conditions.

Solid Carbon Block

For various reasons, the water filter industry favors carbon blocks for POE and POU filters. Primarily, in such form they are easy to handle and exhibit lower dust levels. Both of these facts are more conducive to filter change-outs by the consumer. In the manufacture of the carbon blocks, the carbon is blended with a suitable binder, typically high-density polyethylene, and the carbon block formed though a number of distinct, proprietary processes.

EXAMPLE 7

In a laboratory test, an invention carbon product (50×200 mesh particle size) was melt-blended with high-density polyethylene (HDPE) powder at a level of 20% of the dry carbon weight (1 part binder to 5 parts carbon). The solid block formed from the carbon and HDPE binder was crushed and screened to give material that was >90%-325 mesh particle size. The Centaur prior art carbon product was similarly melt-blended with HDPE, and the resulting block crushed to -325 mesh particle size. Using a 3 ppm chloramine solution in water, the chloramine reduction performance of each of the powdered, HDPE-treated carbons was determined in a manner similar to that described in Example 1. The amount of sample in each test corresponded to 200 mg of carbon (dry basis). The data obtained are summarized in Table III, together with the corresponding data for the original carbons (not treated with HDPE). The data are also shown graphically in FIG. 9 to permit a more ready comparison.

TABLE III

Influence of HDPE Binder on Chloramine Removal Performance of Catalytic Carbons

| Contact Time (minutes) | Amount of Chloramine Removed (%) | | | |
|---|---|---|---|---|
| | Invention Carbon | | Prior Art Carbon (Centaur) | |
| | Without Binder | With Binder | Without Binder | With Binder |
| 2 | 83 | | 45 | |
| 3 | | 87 | | 26 |
| 5 | 100 | 100 | 82 | 42 |
| 10 | 100 | 100 | 100 | 60 |
| 15 | 100 | 100 | 100 | 69 |

Figure 9:
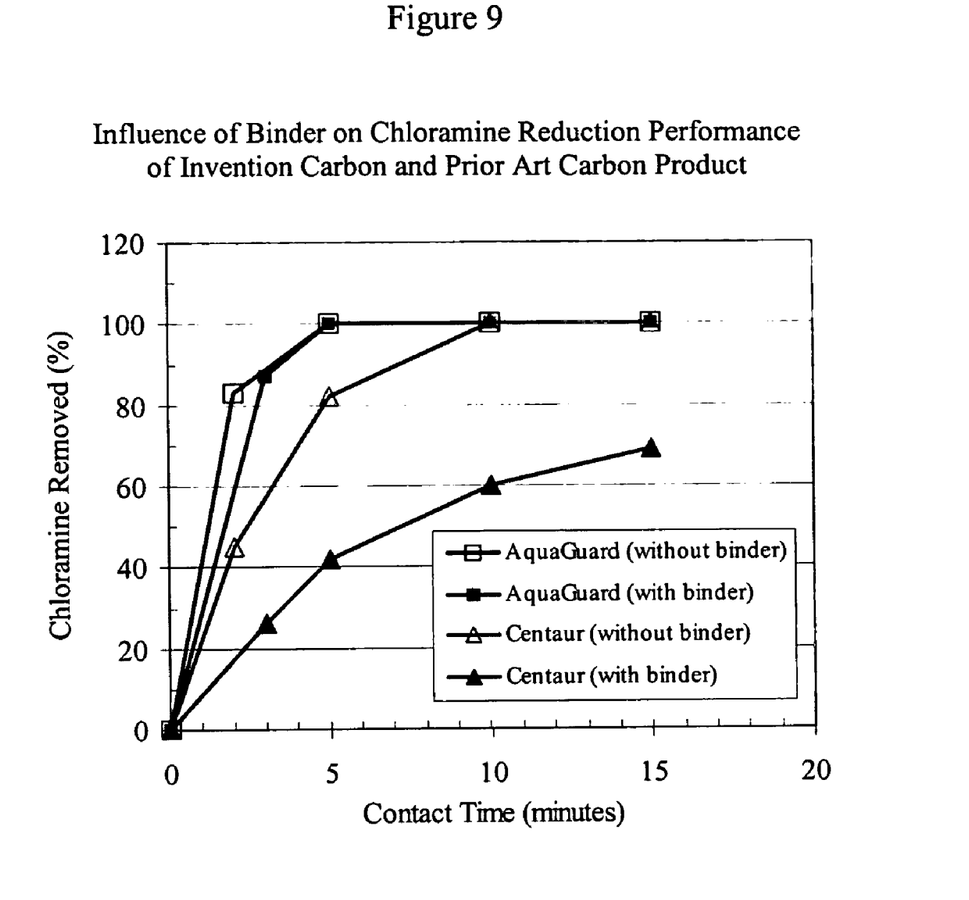
FIG. 9 is a graphical representation of the influence of polyethylene binder on the chloramine-reduction performance of invention carbon product and prior art carbon product.

It is apparent from FIG. 9 and Table III that melt-blending the invention carbon with HDPE binder did not impact the chloramine reduction performance of the invention carbon. In a time frame relevant to POU filters, chloramine in the test water was quickly reduced by both the original prior art carbon and the HDPE-treated prior art carbon. In marked contrast, however, it is equally apparent from FIG. 9 that the HDPE binder had a pronounced, adverse impact on the chloramine reduction performance of the prior art Centaur® product. The performance of the prior art carbon product was reduced by over 50% following melt-blending with the HDPE binder at the 20 wt % level typically used for filter block manufacture. This substantial loss in chloramine reduction performance of the prior art carbon was attributed to, as mentioned earlier, the poor wetability of the Centaur® product, which is exacerbated upon addition of a hydrophobic binder such as polyethylene. In fact, although the same test protocol was used for both the invention and prior art carbon products, it was necessary to add a small amount of surfactant to the water containing the prior art carbon to get the carbon to wet at all. In the absence of the surfactant, the HDPE-treated prior art carbon did not wet over the fifteen-minute time frame of the test, resulting in little measurable chloramine reduction in the test water. In marked contrast, the invention carbon product readily wetted in both the virgin and blended forms, did not require a surfactant, and exhibited substantially superior chloramine removal performance.

In summary, the invention carbon could be formed into blocks, using a standard polyethylene binder, without loss of chloramine reduction capacity.

While presently preferred embodiments of the invention have been described in detail, the invention may be otherwise embodied within the scope of the appended claims.

What is claimed is:

1. In a process for the removal of chloramines from chloramine-containing fluid solutions or streams comprising the step of contacting said solutions or streams with an activated carbon, the improvement comprising an activated carbon characterized by having present in the graphene structure of the carbon from 0.01 to 10 wt % of aromatic nitrogen species, with at least 46% of nitrogen positioned as an aromatic center configuration within a graphene layer and wherein the process achieves a chloramines removal of at least 50% at one minute of contact.

2. The process of claim 1 wherein the carbon has been treated by a process of pyrolyzing the carbon while simultaneously passing a gas stream containing $NH_3$ through a bed of the carbon.

3. The process of claim 2 wherein the gas stream includes both $NH_3$ and an oxygen-containing gas or vapor.

4. The process of claim 3 wherein the gas stream includes a $NH_3$/oxygen-containing gas mixture from the group consisting of $NH_3/CO_2$, $NH_3/O_2$, $NH_3/H_2O$, and $NH_3/NO_x$.

5. The process of claim 4 wherein the $NH_3$/oxygen-containing gas mixture is $NH_3/H_2O$.

6. The process of claim 2 where the carbon is shaped in the form of a block.

7. The process of claim 1 wherein the process achieves a chloramines removal of at least 0.88 grams per liter of activated carbon at one minute of contact.

8. The process of claim 1 wherein the carbon is characterized by the presence in the graphene structure of the carbon of from 0.02 to 7 wt % of aromatic nitrogen species.

9. The process of claim 8 wherein the carbon is characterized by the presence in the graphene structure of the carbon of from 0.03 to 5 wt % of aromatic nitrogen species.

10. The process of claim 1 wherein the solutions or streams are aqueous.

11. The process of claim 1 wherein the activated carbon is derived from a carbon-containing material.

12. The process of claim 11 where the carbon-containing material contains nitrogen in its chemical structure.

13. The process of claim 11 wherein the activated carbon is derived from a material selected from coal, wood, nut shell, pitch, peat, fruit pit, cellulose, lignin, and agricultural waste materials.

14. The process of claim 1 wherein the pyrolyzing temperature is above about 700° C.

15. The process of claim 1 where the carbon is shaped in the form of a block.

16. The process of claim 12 where the carbon is shaped in the form of a block.

* * * * *